US011668839B2

(12) United States Patent
Savoy, Jr.

(10) Patent No.: US 11,668,839 B2
(45) Date of Patent: *Jun. 6, 2023

(54) TERRAIN DATABASE ASSISTED GNSS SPOOFING DETERMINATION USING RADAR OBSERVATIONS

(71) Applicant: Honeywell International Inc., Charlotte, NC (US)

(72) Inventor: John D. Savoy, Jr., Olathe, KS (US)

(73) Assignee: Honeywell International Inc., Charlotte, NC (US)

( * ) Notice: Subject to any disclaimer, the term of this patent is extended or adjusted under 35 U.S.C. 154(b) by 365 days.

This patent is subject to a terminal disclaimer.

(21) Appl. No.: 17/107,609

(22) Filed: Nov. 30, 2020

(65) Prior Publication Data

US 2022/0171074 A1 Jun. 2, 2022

(51) Int. Cl.
*G01S 19/39* (2010.01)
*G01S 19/42* (2010.01)
(Continued)

(52) U.S. Cl.
CPC ............ *G01S 19/396* (2019.08); *G01S 19/21* (2013.01); *G01S 19/26* (2013.01); *G01S 19/42* (2013.01); *G06F 16/29* (2019.01)

(58) Field of Classification Search
CPC ........ G01S 19/396; G01S 19/21; G01S 19/26; G01S 19/42; G01S 13/935; G01S 17/86;
(Continued)

(56) References Cited

U.S. PATENT DOCUMENTS

| 5,995,042 A | 11/1999 | Durboraw, III et al. |
| 6,864,836 B1 | 3/2005 | Hatch et al. |
| (Continued) | | |

FOREIGN PATENT DOCUMENTS

| CN | 109061683 A | 12/2018 |
| EP | 3379295 A1 | 9/2018 |
| (Continued) | | |

OTHER PUBLICATIONS

U.S. Patent and Trademark Office, "Office Action", U.S. Appl. No. 17/107,583, filed Jan. 13, 2022, pp. 1 through 20, Published: US.
(Continued)

*Primary Examiner* — Yuen Wong
(74) *Attorney, Agent, or Firm* — Fogg & Powers LLC

(57) ABSTRACT

Improvements in Global Navigation Satellite System (GNSS) spoofing detection of a vehicle are disclosed utilizing bearing and/or range measurements acquired independently from GNSS technology. Bearing and/or range measurements are determined from a GNSS-calculated position. Additionally, bearing and/or range measurements are acquired from an independent sensor, such as a Radio Detection and Ranging (radar) and a terrain database. The differences between the GNSS-based bearing and/or range and the bearing and/or range determined from the independent sensor, along with any applicable sources of error or uncertainty (including the post-hoc residuals from the GNSS-calculated position), are input into an analytical algorithm (e.g., RAIM) to determine whether GNSS spoofing is present with respect to the calculated GNSS position. If spoofing is detected, an alternative position determining system can be used in lieu of GNSS technology, and alerts can be sent notifying appropriate entities of the spoofing result.

20 Claims, 5 Drawing Sheets

(51) Int. Cl.
*G06F 16/29* (2019.01)
*G01S 19/21* (2010.01)
*G01S 19/26* (2010.01)

(58) Field of Classification Search
CPC ........ G01S 17/933; G01S 13/86; G01S 19/15; G01S 19/48; G01S 19/215; G06F 16/29
See application file for complete search history.

(56) References Cited

U.S. PATENT DOCUMENTS

| | | | |
|---|---|---|---|
| 6,901,331 | B1 | 5/2005 | Beckmann et al. |
| 6,944,541 | B2 | 9/2005 | Pasturel et al. |
| 7,372,400 | B2 | 5/2008 | Cohen et al. |
| 9,217,792 | B2 | 12/2015 | Wu |
| 9,218,741 | B2 | 12/2015 | Wu et al. |
| 9,476,962 | B2 | 10/2016 | Murphy et al. |
| 9,513,376 | B1 | 12/2016 | Heinrich et al. |
| 9,983,314 | B2 | 5/2018 | Vercier |
| 10,162,060 | B2 | 12/2018 | Jaeckle |
| 10,408,942 | B2 | 9/2019 | Kim et al. |
| 2016/0178752 | A1 | 6/2016 | Davies et al. |
| 2018/0217266 | A1 | 8/2018 | Kim et al. |
| 2019/0204450 | A1 | 7/2019 | Revol |
| 2019/0243002 | A1* | 8/2019 | Song ........................ G01S 19/20 |
| 2022/0171073 | A1 | 6/2022 | Savoy, Jr. |

FOREIGN PATENT DOCUMENTS

| | | |
|---|---|---|
| WO | 9747987 A1 | 12/1997 |
| WO | 2018174822 A1 | 9/2018 |

OTHER PUBLICATIONS

European Patent Office, "Extended European Search Report from EP Application No. 21209068.2", from Foreign Counterpart to U.S. Appl. No. 17/107,609, filed Aug. 1, 2022, pp. 1 through 10, Published: EP.

Shen, et al., "Drift with Devil: Security of Multi-Sensor Fusion based Localization in High-Level Autonomous Driving under GPS Spoofing (Extended Version)", Aug. 12, 2020, ARXIV. org, Cornell University Library, Ithaca, NY, pp. 1 through 21.

European Patent Office, "Extended European Search Report from EP Application No. 21208816.5", from Foreign Counterpart to U.S. Appl. No. 17/107,583, filed Jul. 15, 2022, pp. 1 through 9, Published: EP.

Rife et al., "Paired Overbounding and Application to GPS Augmentation", 439-466. 10.1109/PLANS.2004.1309027. (Year: 2004).

"2001 Federal Radionavigation Systems", 2001, pp. 1-126, Department of Defense and Department of Transportation.

Hegarty et al., "Spoofing Detection for Airborne GNSS Equipment", Oct. 2018, pp. 1-20.

Maaref et al., "Enhanced Safety of Autonomous Driving by Incorporating Terrestrial Signals of Opportunity", at least as early as Feb. 14, 2020, pp. 1-5.

Savoy John D. Jr. et al., "GNSS Spoofing Detection Using Terrain Mapping", U.S. Appl. No. 16/814,457, filed Mar. 10, 2020, pp. 1-21, Published: US.

Swaszek et al. "GNSS Spoof Detection Using Passive Ranging", Department of Electrical, Computer, and Biomedical Engineering, 2016, pp. 1-12, The University of Rhode Island.

Swaszek et al., "GNSS Spoof Detection Using Independent Range Information", Department of Electrical, Computer, and Biomedical Engineering, 2016, pp. 1-11, The University of Rhode Island.

Swaszek et al., "The Use of Bearing Measurements for Detecting GNSS Spoofing", Department of Electrical, Computer, and Biomedical Engineering, 2018, pp. 1-18, The University of Rhode Island.

Walter et al., "Future Architectures to Provide Aviation Integrity", at least as early as Feb. 8, 2008, pp. 1-8.

U.S. Patent and Trademark Office, "Notice of Allowance", U.S. Appl. No. 17/107,583, filed Jun. 9, 2022, pp. 1 through 5, Published: US.

* cited by examiner

TERRAIN DATABASE ASSISTED GNSS SPOOFING DETERMINATION USING RADAR OBSERVATIONS

BACKGROUND

In an increasingly globalized economy, aircraft serve as the conduit for facilitating global commerce. Vehicles can transport cargo and passengers across vast distances and many actors (people, businesses, governments, airports) depend on timely vehicle travel. In order to safely navigate through various environments and coordinate effective travel routines, vehicles rely on Global Navigation Satellite System (GNSS) aided navigation technology. These systems facilitate fast and accurate determination of position information, such as lateral position and altitude, to the vehicle via a GNSS receiver.

However, relying on GNSS technology does not come without risks. For instance, false signals can be fed to a GNSS receiver instead of the true signals sent by GNSS satellites. As a result, the manipulated signals convey incorrect position information (e.g. a false position solution or an incorrect clock offset) to the GNSS receiver, which may lead to the vehicle incorporating false information in its navigation aids. Adverse reliance on these "spoofed" signals can lead to a wide variety of serious and potentially deadly consequences, most notably the high risk of crash.

The above phenomenon is known as GNSS spoofing. Left unchecked. GNSS spoofing has the potential to jeopardize confidence in the safe navigation of vehicles, particularly for aircraft travel. GNSS spoofing means the manipulation of GNSS signals before acquisition by a GNSS receiver so that the GNSS receiver determines an incorrect three-dimensional location and/or time. Recently, documented or suspected instances of GNSS spoofing are becoming all too common. Without means for detecting when GNSS signals have been spoofed, a vehicle using GNSS technology incurs a serious risk of losing personnel, goods, or the vehicle itself.

SUMMARY

The details of one or more embodiments are set forth in the description below. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a method is provided. The method comprises determining: (a) bearings to a first set of identified terrain features, and (b) ranges to a second identified set of terrain features. The method further comprises determining a potentially spoofed position using pseudoranges from at least four satellites of a global navigation satellite system (GNSS). The method further comprises determining a post-hoc residual error of each of the pseudoranges. The method further comprises determining: (a) a first set of residual distances where each residual distance is represented by a difference between a determined bearing and an expected bearing based upon the potentially spoofed position projected onto a vector normal to a line of sight between the potentially spoofed position and a location of the first identified set of terrain features, and a first set of estimates of standard deviation, where each standard deviation is of a Gaussian normal distribution overbounding an expected error characteristic of a corresponding residual distance when spoofing is not present, and (b) a second set of residual distances where each residual distance is based upon a difference between the determined range to the second identified set of terrain features and an expected range to the second identified set of terrain features based upon the potentially spoofed position, and a second set of estimates of standard deviation where each standard deviation is of a Gaussian normal distribution overbounding an expected error characteristic of measurement error of the range to the second identified set of terrain features when spoofing is not present. The method further comprises determining whether position determined by a GNSS receiver has been spoofed based upon (a) the post-hoc residual error of each of the pseudoranges, and (b): (i) the determined first set of residual distances and the determined first set of estimates of deviation, and (ii) the determined second set of residual distances and the determined second set of estimates of deviation.

BRIEF DESCRIPTION OF THE DRAWINGS

Exemplary features of the present disclosure, its nature, and various advantages will be apparent from the accompanying drawings and the following detailed description of various embodiments. Non-limiting and non-exhaustive embodiments are described with reference to the accompanying drawings, wherein like labels or reference numbers refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which.

DETAILED DESCRIPTION

Figure 1:
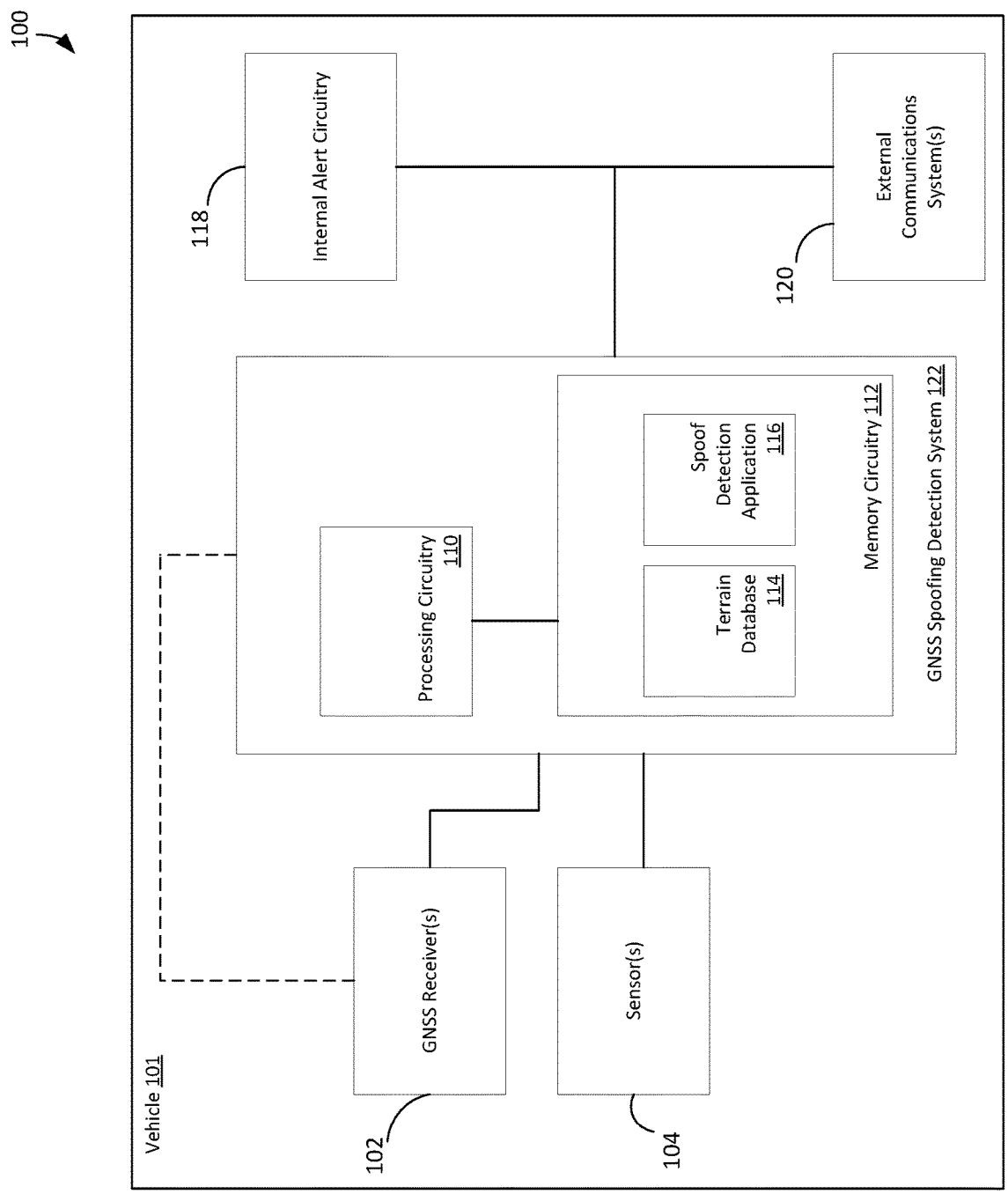
FIG. 1 is a block diagram illustrating one embodiment of a GNSS spoofing detection system.

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

The following disclosure describes related techniques for detecting GNSS spoofing based on measurements by one or more independent sensors (or sensor circuitry) that can be used to verify the integrity of data used by the GNSS receiver to determine its position. Optionally, the sensors can be configured to acquire bearing and/or range relative to a vehicle position and an identified point of interest, such as a terrain feature, structure, which can then ultimately be used to verify position solution(s) of a GNSS receiver. For example, a sensor to obtain bearing and range may be respectively a Very High Frequency Omnidirectional Range (VOR) transmitter, and/or a Distance Measuring Equipment (DME) station or transmitter. Alternatively and/or additionally, a radar and/or a lidar can be used to obtain such bearing and range. The GNSS position solution can optionally be verified using an analytical algorithm such as a receiver autonomous integrity monitoring (RAIM) class analytical algorithm to detect GNSS spoofing. In some embodiments, bearing data is optionally acquired by a VOR receiver, radar, and/or lidar, while range data may be acquired by a DME receiver, radar, and/or lidar. In some embodiments, bearing and/or range data is optionally acquired by a radar and/or lidar using a terrain database to identify significant terrain features in a geographic area. However, bearing or range measurements can be acquired by additional sensors. Once GNSS spoofing has been detected, a variety of actions can be taken to mitigate the detrimental impacts on the vehicle, including alerting the vehicle, flight crew, and/or ground station of the GNSS spoofing event, excluding the spoofed GNSS data, and/or switching to alternative techniques to determine vehicle position which do not use GNSS data.

The embodiments disclosed herein enable detection of spoofed GNSS signals received by a GNSS receiver. The GNSS receiver may be mounted on or in a vehicle and configured to provide position information to the vehicle, for example an aircraft. Although an aircraft is illustrated throughout the disclosure, this illustration is merely for pedagogical reasons and not intended to be limiting in any sense. Instead, the term "vehicle" is intended to convey the ordinary meaning as understood by one having skill in the art, which includes, but not limited to, airborne vehicles, space vehicles, water borne ships, and other types of vehicles.

GNSS spoofing can be detected by verifying a position solution generated by GNSS data with measurements (e.g. bearing and/or range) from at least one independent sensor or system. To obtain a GNSS position solution, GNSS signals are obtained via a GNSS receiver from a plurality of satellites of the GNSS, for example, four or more satellites. The GNSS receiver can be configured to determine a pseudorange from each of the signals, which is the time-corrected distance between the signal received from a satellite to the GNSS receiver. Each pseudorange measurement will have a corresponding error quantity associated with it, known as an a priori residual. Then, a GNSS position of the vehicle is determined by analyzing the pseudoranges and a priori residuals for at least four satellites of the GNSS. The vehicle position can be determined from these pseudoranges and apriori residuals via trilateration techniques and solved using an analytical technique such as a least squares fit or Kalman filter. As a result of the analysis, a position is determined along with corresponding residuals, known as a posteriori, or post-hoc residuals. The GNSS solution comprises the position of the vehicle along with the corresponding post-hoc residuals.

Embodiments of the present disclosure have been designed to determine if the GNSS solution described above is based on spoofed data. Embodiments of the present disclosure verify the GNSS solution with data input from one or more independent sensors or systems to ultimately determine whether the GNSS solution is based on spoofed data. The embodiments described below use bearing and/or range measurements obtained from independent sensors to provide a check on GNSS integrity. Specifically, the embodiments disclosed herein can implement one or more sensors to obtain range (e.g. radar(s), lidar(s), and/or DME receiver(s)) and/or bearing (e.g., radar(s), lidar(s), and/or VOR receiver(s)) measurements to compare with corresponding bearing and/or range measurements using the acquired GNSS solution. The differences between the expected and measured bearing and/or range measurements, and corresponding errors, can be analyzed to determine whether GNSS spoofing is present. In exemplary embodiments, spoofing is determined using an analytical algorithm, for example, a receiver autonomous integrity monitoring (RAIM) algorithm.

Bearing as used herein means the relative angle formed between a vehicle and a point of another object, such as an identified terrain feature (natural or man-made structure) or VOR transmitter, with respect to an absolute reference direction (e.g., true north). Range as used herein means the distance between a vehicle and a point of another object, such as an identified terrain feature or DME transmitter. Though only independent range or bearing measurements alone can be used to verify the integrity of a GNSS position solution, having both range and bearing utilized can more accurately identify spoofing events with an increased confidence that GNSS data is or is not spoofed. Also, cases where more than one bearing and/or range measurement is used (for example, by ranges determined both by a radar and DME receiver and/or bearings determined both by a radar and VOR receiver) can provide a better determination of GNSS spoofing than only one measurement.

At a general level, GNSS spoofing can be detected using measurements provided by independent sensors as follows. A GNSS position solution (including associated post-hoc residuals) is acquired based on pseudoranges to a GNSS receiver from a plurality of satellites in a satellite constellation, as described in further detail below. Using various means, at least one point of interest is identified to provide a reference for determining a bearing and/or range to that point of interest. Example points of interests that can be identified include terrain feature/structure from a terrain database or a VOR transmitter from a VOR ground station. Then, sensor(s) that are independent of GNSS technology onboard the vehicle are configured to determine a measured bearing and/or range measurement based on the point of interest, which may otherwise be referred to as a "measured bearing and/or range". Similarly, a bearing and/or range measurement is also determined using that same points of interest(s) at the position determined by the GNSS position solution, which may be referred to as an "expected bearing and/or range". The measured bearing and/or range and the expected bearing and/or range are compared to determine the corresponding difference between the expected measurements (the bearing and/or range quantities derived from the GNSS position solution) and the measured quantities (the bearing and/or range measurements derived from non-GNSS sources). This difference is referred to as a "residual distance". Although bearing is expressed as an angular quantity, techniques are described in further detail below for converting a bearing angle to a corresponding distance quantity in FIG. 3.

If the signals sent to the GNSS receiver are not being spoofed, then a difference between a measured bearing and an expected bearing would be less than a first threshold level, a difference between a measured range and an expected range measurement would be less than a second threshold level, where each of the first and second threshold levels equals a number equal to or greater than zero. In other words, if GNSS spoofing is not occurring, the expected and measured bearing and/or range measurements should be the same (assuming no intrinsic error in the GNSS and independent sensor measurements). However, if the GNSS position solution is subject to GNSS spoofing, then there will be a large enough difference between the expected and measured bearing and/or range measurements that spoofing can be inferred. This is because the independent sensor(s) used to determine bearing and/or range do so without utilizing data acquired from the GNSS receiver, and thus are resistant to GNSS signal spoofing. Accordingly, the bearing and/or range measurements determined from the independent sensor(s) represent the true position of the vehicle.

Additionally, the measured bearing and/or range will also have corresponding error (e.g., standard deviation) associated with the measurements. The magnitude of the error will differ between the type of measurement and the type of sensor used. For example, DME receivers are known to have a non-trivial amount of uncertainty associated with DME measurements. This uncertainty can affect the accuracy of the bearing and/or range measurements used to compare with the expected bearing and/or range measurements determined from the GNSS position solution. Thus, the corresponding uncertainties should also be taken into consideration as described in further detail below when assessing if GNSS spoofing has occurred.

Using the GNSS position solution, residual distances, and error estimates of the bearing and/or range measurements. GNSS spoofing can be determined. In one embodiment, the GNSS position solution, residual distances, and error estimates are input into an analytical algorithm (e.g. RAIM, least squares, parity space) to ultimately determine whether the received GNSS signals have been spoofed. Optionally, the residual distance(s) can be assigned a weight or scale factor based on the error estimates. If spoofing has been detected, an alert can be sent either internally and/or externally and further corrective action can be taken to rectify the issue. By more reliably knowing when GNSS data is being spoofed, a vehicle utilizing GNSS technology can more readily protect against such spoofing and thus provide safer transport.

In some embodiments, the one or more sensors used to determine bearing and/or range includes radar (e.g. radar altimeter(s), radar circuitry), or other types of wave-ranging sensors (e.g. lidar). When radar is used, the GNSS spoofing can be generally determined as follows. First, a terrain database is used to identify one or more significant terrain features, for example, mountains, buildings, towers, trees, coastlines, or other such features that can reliably be distinguished from the surrounding terrain environment. Then, radar onboard the vehicle is configured to determine a measured bearing and/or range measurement based on the identified terrain feature. Similarly, a bearing and/or range measurement is also determined relative to the same terrain feature(s) at the position determined by the GNSS position solution. The measured bearing and/or range and the expected bearing and/or range are compared to determine the residual distance between the two measurements. The residual distance will also include error estimates corresponding to the bearing and/or range measurements acquired by the radar.

In other embodiments, the one or more sensors includes VOR and/or DME receivers. In these embodiments, a VOR and/or DME transmitter (e.g. ground station) becomes the relevant point of interest for determining bearing and/or range, respectively. As used herein, a transmitter emits a corresponding signal dependent on the type of transmitter used (e.g. VOR/DME signal), while the corresponding receiver is configured to receive that signal.

If bearing is desired, then VOR receiver(s) onboard the vehicle are configured to determine a bearing of the vehicle relative to the VOR ground station. If range is desired, then DME receiver(s) onboard the vehicle are configured to determine the lateral distance from the DME ground station to the vehicle. Like with respect to the radar above, an expected bearing and/or range can be determined based on the GNSS position solution. A residual bearing and/or range distance can be determined based on the difference between the measured and expected bearing and/or range measurements, and the GNSS position solution, residual distance(s), and error estimates can be used to determine the presence of GNSS spoofing as described above.

To describe in further detail, FIG. 1 illustrates a block diagram of one embodiment of a GNSS spoofing detection system (system) 100. The system 100 includes at least one GNSS receiver (GNSS receiver(s)) 102, such as a Global Positioning System (GPS) receiver, Globalnaya Navigatsionnaya Sputnikovaya Sistema (GLONASS) receiver, BeiDou receiver, a Galileo receiver, and/or any other type of GNSS receiver. System 100 also includes at least one sensor (sensor(s)) 104. The at least one sensor 104 is configured to measure a bearing and/or range of the vehicle 101 based on a point of interest. The at least one sensor 104 may include a radar, lidar, DME receiver, and/or VOR receiver, or any other type of sensor that can be configured to measure bearing and/or range. For example, if bearing is desired, the at least one sensor 104 can include a radar, VOR receiver, or any other sensor configured to measure the bearing with respect to a point of interest. If range is desired, the at least one sensor 104 can include a radar, DME receiver, or any other sensor configured to measure the range with respect to a point of interest.

The point of interests used to determine bearing or range need not comprise the same location. Also, bearing and/or ranges to more than one point of interest can be determined. For example, if a VOR receiver is used to determine the bearing, the point of interest can be a VOR transmitter at a ground station. Alternatively, or additionally, bearings can also be determined at a different VOR transmitter; or, if radar is used either alone or in combination with VOR receivers, bearing can be determined relative to an identified terrain feature using the radar. The same principle can apply with respect to ranges; that is, ranges can be determined to one or more points of interest such as a DME transmitter(s) at one or more ground stations (if the at least one sensor 104 includes a DME receiver) alone or in combination with range(s) corresponding to one or more identified terrain features (if the at least one sensor 104 includes a radar). Furthermore, the at least one sensor 104 can be configured to determine both bearing and range, for example, using radar. Optionally, bearing and/or range measurements may be determined via the at least one sensor 104. However, system 100 may alternatively include one or more processors to determine a bearing and/or range based on data received by at least one sensor 104.

The at least one GNSS receiver 102 is configured to acquire GNSS signals from four or more satellites of a satellite system. Though at least four satellites are described for pedagogical reasons, one skilled in the art will recognize that various quantities of satellites can be used to determine the GNSS position solution. The at least one GNSS receiver 102 is further configured to use the GNSS signals to determine a plurality of GNSS pseudorange measurements with respect to a three-dimensional position, e.g. of the at least one GNSS receiver 102, and thus the vehicle 101, relative to a body such as Earth. The GNSS pseudorange measurement corresponds to a corrected range (e.g. distance) between the respective satellite in the satellite constellation and the at least one GNSS receiver 102. In addition to pseudoranges, the GNSS signals may also be used to acquire other navigational data about vehicle 101, such as vehicle altitude and vehicle lateral position (e.g. latitude and longitude coordinates).

Each acquired pseudorange can be used to determine the GNSS position solution corresponding to the location of a vehicle at a given time. This can be done using techniques known in the art but will be briefly discussed for further reference. A pseudorange is calculated based on the time-corrected signal between the respective satellite in a GNSS and the GNSS receiver. A GNSS receiver will usually determine multiple pseudoranges to satellites in a GNSS. To acquire a GNSS position solution, each pseudorange is input (for example, via an observation matrix) into an analytical algorithm, such as a least-squares filter or Kalman filter, to obtain the position of the GNSS receiver (and thus the vehicle) with the greatest accuracy (i.e. least error). In doing so, the GNSS position solution also includes an associated uncertainty value. This is known as an a posteriori or post-hoc residual. These residuals can be used to determine whether the GNSS position solution is consistent with measurements (e.g. bearing and/or range) from independent sensors (e.g. VOR receivers, DME receivers, and radar).

The system 100 may be implemented as, e.g. a state machine or a neural network. For pedagogical purposes, FIG. 1 illustrates the system 100 implemented as a state machine comprising processing circuitry 110 coupled to memory circuitry 112. Software and/or data stored in the memory circuitry 112 is executed in the processing circuitry 110. In the illustrated embodiment, a GNSS spoof detection application 116 is stored in the memory circuitry 112.

Optionally, a terrain database 114 is stored in the memory circuitry 112. Optionally, the terrain database 114 comprises pixels defined by lateral position of a surface, and at least a corresponding part of the terrain is associated with a pixel. In the alternative, terrain database 114 comprises one or more grid cells, wherein each grid cell corresponds to a geographical area of the terrain. The grid cells can be represented as rectangles or squares, but may comprise other shapes as well. Such grid cells may or may not have the same area (or size), but at different locations.

The terrain database 114, however, may be stored elsewhere, e.g. in another system communicatively coupled to the GNSS spoofing detection system 100. Optionally, the terrain database 114 may be stored in a ground proximity warning system or circuitry (GPWS) or a Terrain Awareness and Warning System (TAWS) (or terrain awareness and warning circuitry), which are used to warn flight crew if a vehicle is in imminent danger of impacting the ground or another obstacle: the other system, e.g. TAWS, is configured to be communicatively coupled to the GNSS spoofing detection system.

Regardless of its precise implementation, optional terrain database 114 is configured to provide a terrain map of the geographical area of interest so that significant terrain features can be identified. The terrain map should include features that can be reliably identified within the range of the at least one sensor 104. Significant terrain features include mountains, buildings, trees, towers, coastlines, or other such features that can be readily identified from the surrounding environment. For radar and other sensors that may rely on terrain features to determine bearing and/or range, one or more terrain features can be identified using terrain database 114 to determine the bearing and/or range relative to the selected terrain feature(s). However, other sensors that do not rely on terrain features to measure bearing and/or range may not utilize terrain database 114 when measuring the bearing and/or range.

The measurements from the at least one GNSS receiver 102 and the at least one sensor 104 (which may include bearing and/or range measurements) are sent to GNSS spoofing detection system 122, which is configured to process the received measurements and subsequently determine whether the received GNSS signals have been spoofed. The analytical and spoof detection processes described below may be implemented via appropriate circuitry in hardware embodiments, or may be accomplished via the instructions of spoof detection application 116 stored in memory circuitry 112 and executed by processing circuitry 110. For example, GNSS spoofing detection system 122 includes the processing circuitry 110 which is configured to execute the instructions of spoof detection application 116.

GNSS spoofing detection system 122 uses the received bearing and/or range measurements and the GNSS pseudoranges to determine at least one residual distance. As a non-limiting example, only one bearing can be measured by the at least one sensor 104 to a point or points of interest. GNSS spoofing detection system 122 can receive the GNSS pseudoranges and determine a GNSS position solution from the pseudoranges (if not already determined via the at least one GNSS receiver 102). Using the received/determined GNSS position solution, GNSS spoofing detection system 122 can calculate the expected bearing relative to the point(s) of interest and calculate the residual distance between the expected and measured bearing, as described in further detail below. However, in other cases, bearings to more than one point of interest may be acquired, or ranges to multiple points of interests may be acquired. In other embodiments, bearing and/or ranges can be acquired to one or more points of interests. In any of the preceding examples, GNSS spoofing detection system 122 is configured to determine the residual distance between the expected and measured bearings and/or ranges relative to the corresponding points of interests. It can also be configured to assess the relative error of each corresponding residual distance and weigh each residual distance based on the corresponding relative error.

Once GNSS spoofing detection system 122 has received or determined the GNSS position solution, residual distance(s), and errors, it can then verify the integrity of the GNSS position solution based on the residual distance(s) and errors (e.g. by GNSS spoof application 116). For example, GNSS spoofing detection system 122 can input the values into an analytical algorithm, such as a RAIM-based algorithm. The results of the integrity check can be used to indicate whether the GNSS position solution is consistent with the bearing and/or range measurements acquired by the at least one sensor 104. An exemplary non-limiting example of an analytical algorithm is described in U.S. Pat. No.

8,610,624, and the contents of U.S. Pat. No. 8,610,624 are hereby incorporated by reference in its entirety. Spoofing detection system 122 may then optionally send the results of the analytical algorithm to internal alert circuitry 118 and/or external communications system(s) 120. For example, internal alert circuitry 118 can issue an alert to crew members onboard the vehicle to notify them of the detecting spoofing event. Alternatively, or additionally, spoofing detection system 122 may also take further corrective action, such as disabling use of the at least one GNSS receiver 102 and switching to an alternative positioning system to use for vehicle navigation, for example, an inertial navigation system. Optionally, spoofing detection system 122 may reset the at least one GNSS receiver 102 after a period of time to see if GNSS spoofing is still present in received GNSS signals. If spoofing it no longer present, then spoofing detection system 122 may switch back to a GNSS positioning system.

The output of the analytical algorithm is used to determine whether GNSS spoofing is present with respect to received GNSS signals and may be representative in different ways. For example, the output may be a quantity that corresponds to the level of consistency between the post-hoc residuals of the GNSS position solution and residual distance(s) input into the analytical algorithm. If there is inconsistency between the post-hoc residuals and the residual distance(s), then the output may reflect a high quantity. If there is consistency, the quantity may be lower depending on the strength of the consistency. This quantity may be compared to a threshold value, wherein the threshold is indicative of a significant likelihood of GNSS spoofing, as described in U.S. Pat. No. 8,610,624. That is, if the quantity is greater than the threshold, then GNSS spoofing is likely present and internal circuitry 118 may issue an alert accordingly. However, in other embodiments, the threshold can be set in other ways, such as wherein a value below the threshold is indicative of inconsistency.

Yet, although GNSS spoofing detection system 122 can be configured to analyze both bearing and range measurements, both sets of measurements need not be required to perform the techniques described herein. In other words, only range or bearing data can be used to verify GNSS data to determine whether GNSS signals have been spoofed. So long as the data originates from a sensor independent of the at least one GNSS receiver 102 and can be used to verify data acquired from the at least one GNSS receiver 102, such bearing or range data can provide an improved means for detecting GNSS spoofing. However, there are certain advantages to using both bearing and range data. First, using both measurements provides an additional degree of reliability in assessing the integrity of GNSS data. That is, comparing two variables of data (e.g. bearing and range) rather than only one variable can increase the reliability of the GNSS spoofing algorithm, because more sets of independent data are used to verify the integrity of the GNSS measurements, particularly if the range and bearing data are acquired from different systems independent of the at least one GNSS receiver 102.

Second, comparing additional variables from independent sensors may better protect the reliability of the GNSS detection algorithm from manipulation, such as from spoofing or hacking of other vehicle equipment (e.g. radar circuitry or other position determining systems). In other words, it becomes increasingly more difficult to spoof additional equipment that provide independent data sets for comparison. Moreover, increasing the points of interest used to determine either bearing or range measurements can provide additional sources of data to verify the acquired GNSS position solution. Thus, increasing the sets of data included in the spoofing detection algorithm to incorporate both bearing and range measurements will ordinarily increase the effectiveness of the spoofing detection.

Figure 2:
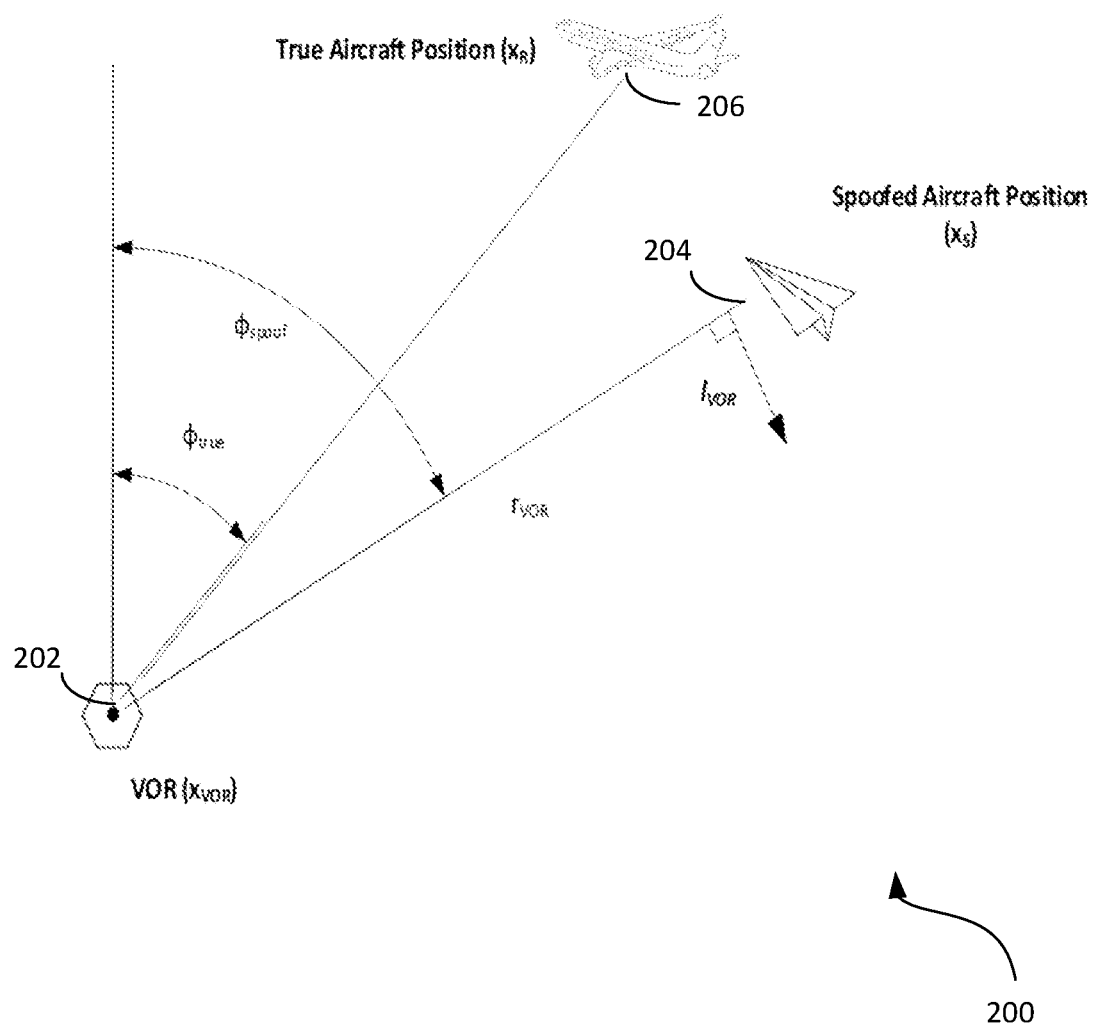
FIG. 2 is a diagram illustrating one embodiment of a bearing of a vehicle relative to a VOR transmitter with respect to the actual position of the vehicle and a position determined using a GNSS.

FIGS. 2-5 describe in further detail how bearing measurements can be acquired using different sensor variations based on exemplary points of interest as described with respect to at least one sensor 104. FIG. 2 illustrates a diagram 200 of a bearing of a vehicle relative to a VOR transmitter 202 with respect to the actual position of the vehicle and a position determined using a GNSS. In this embodiment, the at least one sensor 104 includes one or more VOR receivers configured to determine a bearing from the vehicle relative to a VOR transmitter. Here, VOR transmitter 202 corresponds to the point of interest from which bearing may be determined. As will be recognized, however, the process for computing the bearing of a vehicle can be realized through other sensors beyond the VOR receivers described below.

Referring to FIG. 2, the differing positions of the vehicles are represented by $X_R$, which represents the actual position of vehicle 206 (the true position), and $X_S$, which represents the spoofed position of vehicle 204 (the position believed as accurate by the GNSS receiver). In the case where GNSS signals received by the GNSS receiver are not spoofed, $X_R$ and $X_S$ would be equal. Each position $X_R$ and $X_S$ also has a corresponding bearing angle, respectively labelled as $\phi_{true}$ and $\phi_{spoof}$, relative to a line intersecting VOR station 202 at position $X_{VOR}$. If the vectors connecting $X_{VOR}$ and either $X_R$ or $X_S$ lie overlapping in parallel (e.g. are on top of one another), then $\phi_{true}$ and $\phi_{spoof}$ would be equal. However, this does not necessarily mean spoofing is absent, only that the position determined by a VOR sensor ($X_R$) has a bearing angle equivalent to that of the GNSS position solution ($X_S$). As illustrated below, although unlikely, a GNSS position solution can still place the vehicle ($X_S$) such that the bearing angles are equivalent yet spoof the position by altering the distance (e.g. range) between VOR station 202 and presumed vehicle location 204. Since VOR bearing observations provide no information on azimuthal components of position (e.g. distance), FIG. 2 therefore illustrates the advantages of using both bearing and range measurements to detect GNSS spoofing.

Assuming that $\phi_{true}$ and $\phi_{spoof}$ are not equal, the bearing angles can be used to determine the respective residual distance created by the bearing angles relative to a fixed reference vector. Put another way, while bearing angles can be compared directly, it can be more convenient to translate the bearing angles to a corresponding residual distance that can be used to determine whether the GNSS position solution deviates significantly from expectations, and if so, whether such deviation indicates the received GNSS signals have been spoofed. Thus, embodiments that implement bearing measurements to detect GNSS spoofing first translate the bearing angle into a corresponding residual distance to compare the lateral distances determined by the VOR receiver and GNSS receiver. The residual distance can be observed via projecting the bearing angles as described below.

Figure 3:
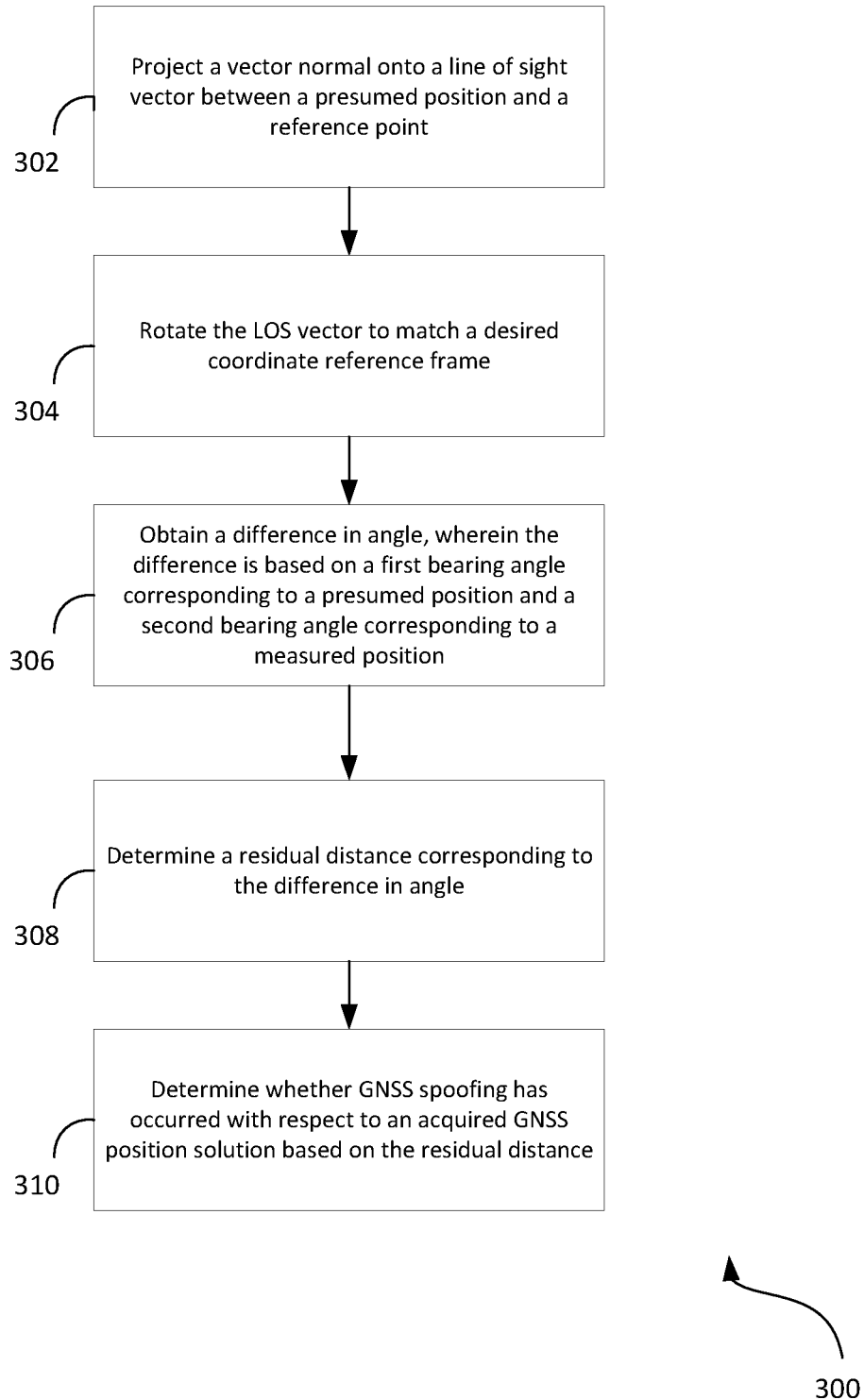
FIG. 3 is a flow chart illustrating one embodiment of a method for determining a residual distance of a bearing of a vehicle.

FIG. 3 illustrates one technique for determining the residual distance of a bearing of a vehicle based on a reference point, such as a VOR transmitter or identified terrain feature. Method 300 may be implemented using the techniques described with respect to FIGS. 1, 2, and 4 but may be implemented by other means as well. The blocks of the flow diagram have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 300 begins at block 302, project a vector normal onto a line of sight vector between a presumed position and a point of interest. Using FIG. 2 as an example, to translate the bearing angle into a residual distance, a line of sight (LOS) vector $l_{VOR}$ is defined normal to the vector between the vehicle's perceived position $X_S$ and VOR transmitter 202 $X_{VOR}$ (illustrated as $r_{VOR}$ in FIG. 2). The magnitude of $l_{VOR}$ can be determined by the following equation:

$$L_{VOR} = (X_{VOR} - X_S) \times u_{vert} \qquad \text{Equation 1}$$

where $u_{vert}$ is a unit vector normal to the tangent plane. The vector can be normalized in the Earth-centered, Earth-fixed coordinate system (hereinafter "ECEF") as shown:

$$l_{VOR,ecef} = \frac{L_{VOR}}{\|L_{VOR}\|} \qquad \text{Equation 2}$$

where $l_{VOR,ecef}$ represents the normalized vector in the ECEF reference frame and $\|L_{VOR}\|$ is the scalar magnitude of $L_{VOR}$.

Sometimes, however, it may be beneficial to rotate the normalized LOS vector in order to change coordinate reference frames. Therefore, in some embodiments, method 300 optionally proceeds to block 304, rotate the LOS vector to match a desired coordinate reference frame. For example, vector $l_{VOR,ecef}$ be rotated to a North/East/Down (hereinafter "NED") coordinate reference frame as follows:

$$l_{VOR} = C_{NED}^{ECEF} l_{VOR,ecef} \qquad \text{Equation 3}$$

where $C_{NED}^{ECEF}$ is a coordinate rotation constant. Because bearing measurements from a VOR receiver do not include vertical components of position, the component of $l_{VOR}$ corresponding to vertical ("down") coordinates is set to zero:

$$l_{VOR} = l_{north} l_{east} l_{down} = l_{north} l_{east} 0$$

Now that an observation vector $l_{VOR}$ has been defined to observe the offset difference in bearing, the observed bearing angle difference can be transformed to a residual distance. Proceeding to block 306 of method 300, obtain a difference in angle, wherein the difference is based on a first bearing angle (e.g. $\phi_{spoof}$) corresponding to an expected position, for example, a spoofed position, and a second bearing angle (e.g. $\phi_{true}$) corresponding to a measured, for example, a true position. Referring to FIG. 2, the difference in bearing angle is defined as the difference between the expected ($\phi_{spoof}$) and the measured bearing ($\phi_{true}$):

$$\Delta\phi = \phi_{spoof} - \phi_{true} \qquad \text{Equation 4}$$

Method 300 then proceeds to block 308, determine a residual distance corresponding to the difference in angle. The angular difference, $\Delta\phi$ is then transformed to an offset angle along $l_{VOR}$ (Equations 5a and 5b, respectively):

$$\sin\Delta\phi = \frac{\Delta\rho_{VOR}}{r_{VOR}} \qquad \text{Equation 5a}$$

$$\Delta\rho_{VOR} = \|x_S - X_{VOR}\|\sin\Delta\phi \qquad \text{Equation 5b}$$

where $\Delta\rho_{VOR}$ is the notional residual distance between the expected position $X_S$ and the measured position $X_R$ orthogonal to the normalized VOR LOS vector $l_{VOR}$.

Method 300 ends at block 310, determine whether GNSS spoofing has occurred with respect to an acquired GNSS position solution based on the residual distance. In exemplary embodiments, the bearing measurements are input into an analytical algorithm, such as a RAIM algorithm, to determine the consistency of the GNSS position solution. Though many variants of RAIM exist in the art, the following equation illustrates generally how data is input into a RAIM algorithm:

$$z = G \cdot x + v \qquad \text{Equation 6}$$

where z is an N-vector of measurements, G is an N×M observation matrix, x is an M-vector of unknown values, and v is an N-vector of error measurements. While normally observation matrix G comprises only GNSS data, the techniques described below also incorporate independent bearing and/or range measurements into the observation matrix itself. For the GNSS measurements, an LOS vector $l_{GNSS}$ can be acquired with respect to a particular satellite, i, based on the following equation:

$$l_{GNSS,i} = C_{NED}^{ECEF} \frac{(x_{SV,i} - x_s)}{\|x_{SV,i} - x_s\|} \qquad \text{Equation 7}$$

where $x_{SV,i}$ is the position of the satellite and $x_s$ is the position of the GNSS receiver.

To incorporate the bearing measurements acquired by the VOR sensor, an observation matrix, G, is formed with the exemplary structure:

$$G = \begin{bmatrix} l_{GNSS,1} & 1 \\ l_{GNSS,2} & 1 \\ \vdots & \vdots \\ l_{GNSS,n} & 1 \\ l_{VOR,1} & 0 \\ l_{VOR,2} & 0 \\ \vdots & \vdots \\ l_{VOR,n} & 0 \end{bmatrix}$$

where n is the nth LOS vector. The second column in the observation matrix G corresponds to the clock signal used to determine the pseudoranges acquired by the GNSS signals, represented as a 1 value. Since VOR measurements are not impacted by the GNSS clock signal, the second column corresponding to VOR measurements is represented as a 0 value. This observation matrix can then be used to determine the consistency of the acquired GNSS position solution based on bearing measurements using the same analytical techniques as those used to generate the GNSS position solution.

In addition to the residual distances determined from the bearing (and as described below, range) measurements, the accuracy of the bearing and/or range measurements used is also taken into consideration when assessing the consistency between the two position solutions. That is, the error associated with the sensors used to acquire bearing and/or range measurements should be considered when assessing whether GNSS spoofing is present. This is reflected as v in Equation 6 above. A brief illustration of how such error can be calculated with regard to VOR and DME measurements is provided below; however, one skilled in the art will recognize that the error can be quantified via other sensors used to determine bearing and/or range measurements and that the general mathematical and logical principles described with respect to quantifying such error can be analogized to other sensors.

The error of the bearing measurements can be empirically determined based on the technology used to acquire the measurements. For example, error can accumulate in bearing measurements acquired using VOR via the ground station and encoding of the VOR location (e.g. from a navigation database). For radar measurements, uncertainties in identifying the location of a terrain feature can also be considered. Like the bearing angle measurements, the error can also be transformed into a corresponding distance quantity. For example, in an embodiment, the standard deviation of the error of each bearing measurement is obtained and used to determine the corresponding error residual distance. The standard deviation is part of a normal Gaussian distribution function. For VOR bearing measurements, this distance can be obtained by the following equations:

$$\sin\sigma_{\phi,gnd} = \frac{\sigma_{\rho,VOR}}{r_{VOR}} \quad \text{Equation 8a}$$

$$\sigma_{\rho,VOR,gnd} = \|x_S - x_{VOR}\|\sin\sigma_{\phi,gnd} \quad \text{Equation 8b}$$

where $\sigma_{\phi,gnd}$ is the standard deviation of the error associated with the bearing angle from the ground station and $\sigma_{\rho,VOR,gnd}$ is the corresponding error residual distance from the ground station. Equations 8a and 8b can be further modified to add any additional sources of error present in obtaining bearing measurements (e.g. known error associated in encoding the VOR location). Once the error has been quantified, the error can be weighted, for example, by the following equation:

$$w_{VOR,i} = \frac{1}{\sigma_{\rho,VORi}} \quad \text{Equation 9}$$

where $w_{VOR,i}$ is the weighting value (alternatively, scaling factor) of the ith standard deviation in a set of standard deviation estimations. Each set can be illustrated as a vector quantity that can be used to input into the RAIM algorithm based on Equation 6 above.

Once the modified observation matrix and error has been determined, these values can be used to determine GNSS spoofing of the received GNSS signals. However, as described above, it can be advantageous to also consider the range of the GNSS position solution with respect to a reference point. Therefore, in an embodiment, range measurements acquired by one or more DME receivers are optionally configured to measure the range of the vehicle position, which may be combined with GNSS measurements either alone or optionally in combination with bearing measurements obtained by one or more VOR sensors to assess whether the GNSS position solution based only off GNSS data has been spoofed.

To determine the range, an LOS vector is obtained from the point of reference (e.g. a DME ground station) to the range sensor onboard the vehicle (e.g. a DME receiver). The LOS vector, $l_{DME}$, can be expressed by the following equation:

$$l_{DME} = C_{NED}^{ECEF} \frac{x_{DME} - x_S}{\|x_{DME} - x_S\|} \quad \text{Equation 10}$$

where $x_{DME}$ is the location of the DME ground station. The DME range measurements can be incorporated with the GNSS pseudorange measurements similar to the bearing measurements described above. That is, an observation matrix G can be expressed as:

$$G = \begin{bmatrix} l_{GNSS,1} & 1 \\ l_{GNSS,2} & 1 \\ \vdots & \vdots \\ l_{GNSS,n} & 1 \\ l_{VOR,1} & 0 \\ \vdots & \vdots \\ l_{VOR,m} & 0 \\ l_{DME,1} & 0 \\ \vdots & \vdots \\ l_{DME,k} & 0 \end{bmatrix}$$

where $l_{GNSS,n}$ is the LOS vector for the nth satellite of a GNSS constellation, $l_{VOR,m}$ is the LOS vector for a number of bearing measurements m, and $l_{DME,k}$ is the LOS vector for a number of range measurements, k. Although the matrix described above includes both bearing and/or range measurements, one skilled in the art will recognize that the observation matrix can be modified to include only range measurements from any type of range sensor, such as from a DME receiver or radar.

Likewise with respect to bearing, range measurements can also be weighted based on the known error associated with the range measurements. For example, if a DME receiver is used to measure a range to a DME transmitter, the accuracy of the DME receiver, the DME transmitter, and the error in obtaining the range measurement using DME methods can be assessed into the weight of the range measurement. Thus the weight, w, of the DME measurements can be observed as follows:

$$w_{DME,i} = \frac{1}{\sigma_{DME,i}} \quad \text{Equation 11}$$

where $\sigma_{DME,i}$ is the ith standard deviation for the accuracy of the DME measurements in the set of standard deviation estimates. However, one having ordinary skill in the art will recognize that this equation can be modified based on the type of sensor used and any correlating sources of error used to obtain the range measurements. Much like with bearing measurements, the weight of range errors can be expressed as a vector set of quantities that can be input in Equation 6. Furthermore, like with a modified observation matrix that contains both bearing and range measurements incorporated with the GNSS measurements, the weighting or scaling vector exhibited in Equation 6 can likewise include sets of errors for each bearing and/or range measurement.

As described above, the GNSS position solution and corresponding post-hoc residuals, the incorporated bearing and/or range measurements from respective VOR or DME receivers, and the error of the bearing and/or range measurements are used to determine GNSS spoofing. For example, the modified observation matrix, post-hoc GNSS residuals and weighted residual distances can be input into an analytical algorithm to determine whether the GNSS position solution is consistent with the independently acquired bearing and/or range measurements. In some embodiments, the analytical algorithm includes a RAIM-based algorithm. The RAIM algorithm can include any algorithm known in the art, including an advanced-RAIM algorithm ("A-RAIM"). Alternatively, the analytical algorithm can include a least squares or a parity space algorithm. If the results indicate that there is sufficient consistency, then GNSS spoofing has not occurred with respect to the received GNSS signals to the GNSS receiver. But if the results conclude inconsistency between GNSS post-hoc residuals and the residual distances, then GNSS spoofing has been deemed present.

Referring back to FIG. 1, in an embodiment, bearing and/or range are measured by a radar and used to verify the consistency of the acquired GNSS position solution similar to the detection of GNSS spoofing via bearing and/or range measurements provided by VOR and DME receivers as described above. That is, at least one sensor 104 optionally includes one or more radar configured to measure bearing and/or range of the vehicle 101 with respect to an identified terrain feature. Instead of a VOR or DME transmitter as the reference point for determining bearing and/or range, a terrain feature identified via terrain database 114 is used. However, bearings may also be measured from a VOR transmitter in combination with those provided by a radar, and ranges may also be combined in a similar fashion. Thus, FIGS. 2-4 should not be interpreted as mutually exclusive embodiments of the present disclosure, but rather as illustrating particular aspects that may be implemented. Multiple terrain features or sets of terrain features can be sued to measure bearing and/or ranges, and the same terrain features used to measure bearings can also be sued to measure ranges (and vice-versa).

Figure 4:
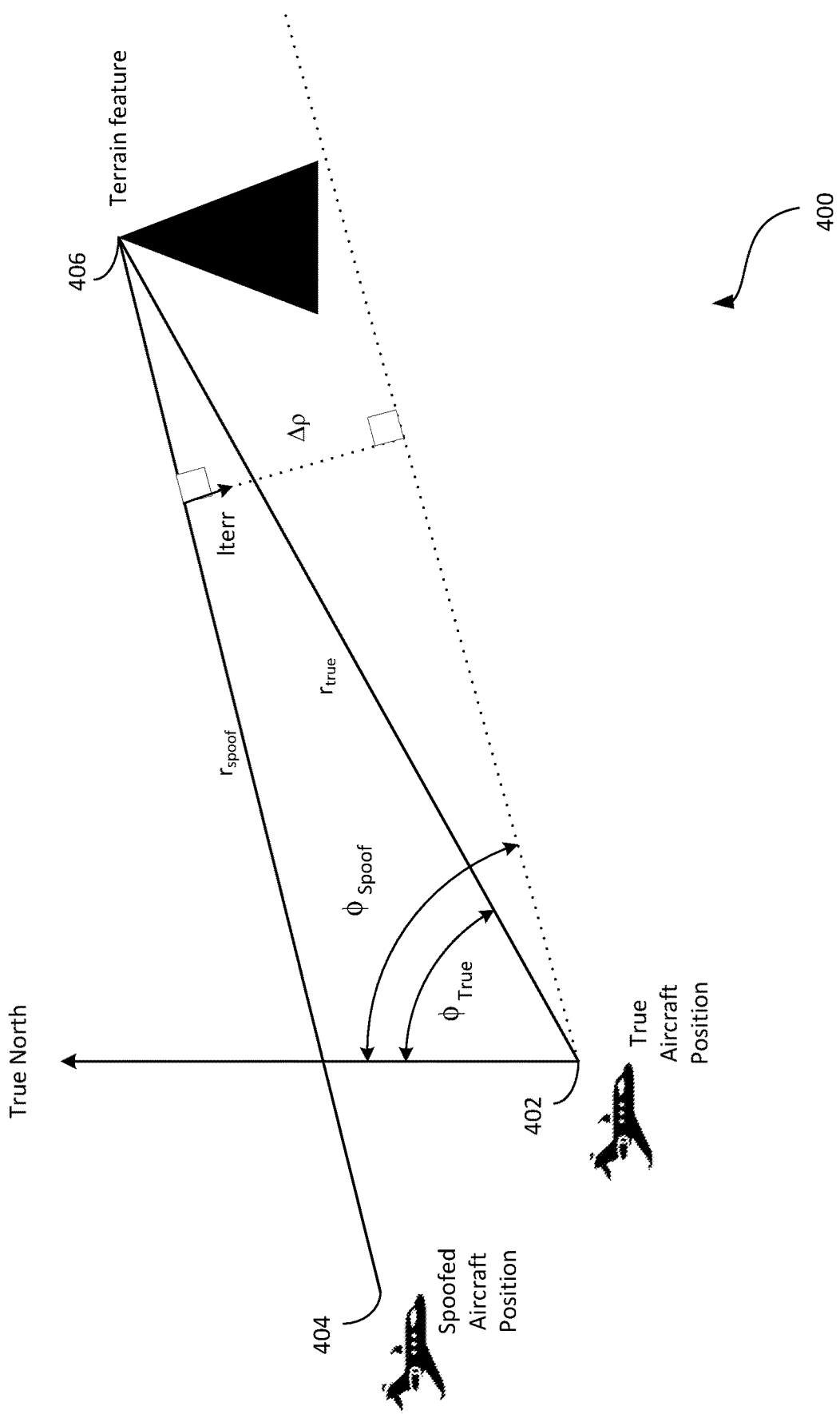
FIG. 4 is a diagram illustrating one embodiment of a bearing of a vehicle relative to a terrain feature with respect to the actual position of the vehicle and a position determined using a GNSS.

FIG. 4 illustrates a diagram 400 of a bearing of a vehicle relative to a terrain feature with respect to the actual position of the vehicle and a position determined using a GNSS. The mathematical principles governing the determination of bearing using a VOR/DME reference point largely apply to FIG. 4. Point 402 represents the actual position of the vehicle (illustrated as an aircraft), while point 404 represents the position determined by the acquired GNSS signals from the at least one GNSS receiver 102. A vector $r_{spoof}$ can be determined to point 402 using the GNSS position solution, while a second vector rime can be independently determined from the at least one sensor (radar) 104 via terrain database 114. Point 406 represents the identified terrain feature that serves as the reference point for determining the bearing angles at points 402 and 404. Like with respect to FIG. 2, the bearing angles are transformed into a residual distance (illustrated in FIG. 4 as $\Delta\rho$ before the measurements are used to determine the consistency of the acquired GNSS position solution.

Bearing can be determined relative to identified terrain features using similar principles embodied in FIG. 3 and as described with respect to bearing to a VOR transmitter above. To observe the bearing to an identified terrain feature, an LOS vector $1_{terr}$ is defined normal to $r_{spoof}$, a vector connecting the presumed (spoofed) location of the vehicle and the terrain feature point 406. This is analogous to block 302 of method 300. The LOS vector can optionally be normalized and rotated as appropriate based on the coordinate reference frame (e.g. ECED to NED coordinates), as illustrated in optional block 304. A difference in the presumed and measured bearing angles ($\Delta\phi$) is determined (block 306) and transformed into a corresponding distance using trigonometric principles described above (e.g. Equations 4-5b) (block 308). This residual distance can then be used to generate a modified observation matrix as described above. Importantly, the observation matrix can be modified to include measured bearing and/or range measurements from any amount of bearings and/or ranges to one or several points of interest in addition to corresponding GNSS measurements. Alternatively, or additionally, the bearing and/or range measurements can be acquired by different sensors.

Optionally, only range measurements from the at least one sensor (radar) 104 are used to detect GNSS spoofing. Optionally, only bearing measurements from the at least one sensor (radar) 104 are used to detect GNSS spoofing. Optionally, both bearing and range measurements from the at least one sensor (radar) 104 are used to detect GNSS spoofing. To determine the range, Equation 10 can be modified based on the point of interest used to determine the range (i.e. by configuring the position of the terrain feature in lieu of the DME transmitter).

Figure 5:
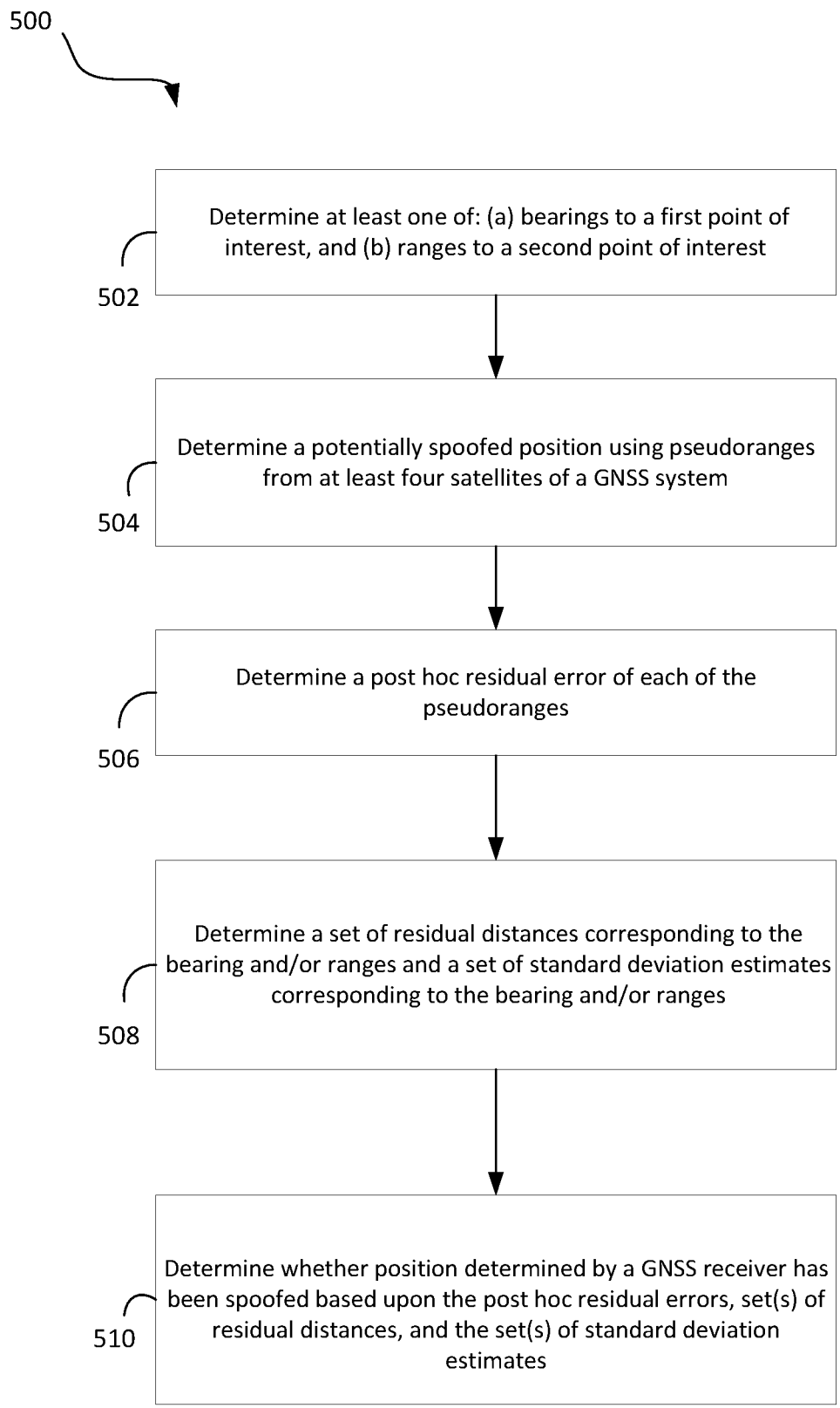
FIG. 5 is a flow chart illustrating one embodiment of a method for detecting GNSS spoofing using bearing and/or range observations.

FIG. 5 illustrates a method 500 for using bearing and/or range observations acquired by independent sensors to detect GNSS spoofing. Method 500 may be implemented using the techniques described above with respect to FIGS. 1-4, but may be implemented via other means as well. The blocks of the flow diagram have been arranged in a generally sequential manner for ease of explanation; however, it is to be understood that this arrangement is merely exemplary, and it should be recognized that the processing associated with method 500 described herein (and the blocks shown in the Figures) may occur in a different order (for example, where at least some of the processing associated with the blocks is performed in parallel and/or in an event-driven manner).

Method 500 begins at block 502, determine at least one of: (a) bearings to a first point of interest, and (b) ranges to a second point of interest. The first and second points of interest may be the same, but in other embodiments can be directed to different points of interest. Bearing can be measured by sensors such as a VOR receiver, radar, or any other type of sensor configured to measure a bearing. Range can be measured by sensors such as a DME receiver, radar, or any other type of sensor configured to measure a range. Optionally, only bearing or range is measured to a point of interest. In some embodiments, the bearing and/or range measurements may be measured from different points of interest, for example, where a first bearing is determined from a VOR transmitter, and a second bearing is determined from a different VOR transmitter and/or an identified terrain feature. Ranges may also be measured from those same points of interest (e.g. to the same identified terrain feature)

or from different points of interest (e.g. to a DME transmitter and/or to a different terrain feature).

Proceeding to block 504, determine a potentially spoofed position using pseudoranges from at least four satellites of a GNSS system. As described above, pseudoranges are the time-corrected distance between a satellite and a GNSS receiver. A GNSS solution can be acquired that determines the expected position of a vehicle based on the acquired pseudoranges.

Method 500 proceeds to block 506, determine a post-hoc residual error of each of the pseudoranges. Such post-hoc residuals can be determined by analytical processing techniques known in the art, such as a least squares algorithm or a Kalman filter.

At block 508, determine a set of residual distances corresponding to the bearing and/or ranges and a set of standard deviation estimates corresponding to the bearing and/or ranges. If bearings are used to detect GNSS spoofing, then a difference between a measured bearing from an independent sensor (such as a VOR receiver or radar) and an expected bearing (using the position acquired from the GNSS data) is determined. If ranges are used to detect GNSS spoofing, then a difference between a measured range and an expected range is determined. Each residual distance measurement, be it a bearing or a range, can be weighted based on the error associated with acquiring the measurement (e.g. the standard deviation of the error), such as by the sensor used to measure the bearing and/or range, or other known or calculated uncertainties.

Method 500 ends at block 510, determine whether position determined by a GNSS receiver has been spoofed based upon the set(s) of residual distances and the set(s) of standard deviation estimates. The spoofing determination can be done by inputting the post-hoc residual errors of the GNSS position solution, the residual distances of the bearing and/or range measurements, and associated error estimates of standard deviation into an analytical algorithm, which can analyze the data for consistency between the GNSS data and the measured bearing and/or range data. In some embodiments, the analytical algorithm includes a RAIM algorithm, such as an A-RAIM algorithm. The results of the integrity check indicate whether the GNSS position solution has likely been spoofed. In those circumstances, an alert may be issued to indicate that spoofing is present and further corrective measures can be taken to mitigate the effects of spoofing.

The embodiments of methods can be implemented by computer executable instructions, such as program modules or components, which are executed by at least one processor. Generally, program modules include routines, programs, objects, data components, data structures, algorithms, and the like, which perform particular tasks or implement particular data types.

Instructions for carrying out the various process tasks, calculations, and generation of other data used in the operation of the methods described herein can be implemented in software, firmware, or other computer-readable or processor-readable instructions. These instructions are typically stored on any appropriate computer program product that includes a computer readable medium used for storage of computer readable instructions or data structures.

The processing circuitry 110 may include any one or combination of processors, microprocessors, digital signal processors, application specific integrated circuits, field programmable gate arrays, and/or other similar variants thereof. The processing circuitry 110 may include or function with software programs, firmware, or other computer readable instructions for carrying out various process tasks, calculations, and control functions, used in the methods described herein. These instructions are typically tangibly embodied on any storage media (or computer readable media) used for storage of computer readable instructions or data structures.

Suitable computer readable media may include storage or memory media such as the memory circuitry 112 illustrated herein. The memory circuitry 112 described herein can be implemented with any available storage media (or computer readable medium) that can be accessed by a general purpose or special purpose computer or processor, or any programmable logic device. Suitable computer readable media may include storage or memory media such as semiconductor, magnetic, and/or optical media, and may be embodied as storing instructions in non-transitory computer readable media, such as random access memory (RAM), read-only memory (ROM), non-volatile RAM, electrically-erasable programmable ROM, flash memory, or other storage media.

EXEMPLARY EMBODIMENTS

Example 1 includes a method, comprising: determining at least one of: (a) bearings to a first point of interest, and (b) ranges to a second point of interest using one or more sensors independent of a global navigation satellite system (GNSS) receiver; determining a potentially spoofed position using pseudoranges of at least four GNSS satellites: determining a post-hoc residual error of each of the pseudoranges; determining at least one of: (a) a first set of one or more residual distances where each residual distance is represented by a difference between the determined bearing and an expected bearing based upon the potentially spoofed position projected onto a vector normal to a line of sight between the potentially spoofed position and a location of the first point of interest, and a first set of estimates of standard deviation, where each standard deviation is of a Gaussian normal distribution overbounding an expected error characteristic of a corresponding residual distance when spoofing is not present, and (b) a second set of one or more residual distances where each residual distance is based on a difference between the determined range to the second point of interest and an expected range to the second point of interest based upon the potentially spoofed position, and a second set of estimates of standard deviation where each standard deviation is of a Gaussian normal distribution overbounding an expected error characteristic of measurement error of the range to the second point of interest when spoofing is not present; and determining whether a position determined by a GNSS receiver has been spoofed based upon (a) the post-hoc residual error of each of the pseudoranges, and (b) at least one of: (i) the determined first set of residual distances and the determined first set of estimates of standard deviation, and (ii) the determined second set of residual distances and the determined second set of estimates of standard deviation.

Example 2 includes the method of Example 1, wherein determining whether the position determined by a GNSS receiver has been spoofed is performed by a receiver autonomous integrity monitoring (RAIM) algorithm.

Example 3 includes the method of Example 2, wherein the RAIM algorithm is an advanced RAIM algorithm.

Example 4 includes the method of any of Examples 1-3, further comprising determining that the position determined by a GNSS receiver has been spoofed, and then generating an alarm signal sent to at least one system, where the alarm signal is configured to cause the at least one system to obtain position data from one or more systems other than the GNSS receiver.

Example 5 includes the method of any of Examples 1-4, wherein: determining at least one of: bearings to a first point of interest further comprises determining bearings via a first sensor; determining at least one of: ranges to a second point of interest further comprises determining ranges via a second sensor; wherein the first sensor is distinct from the second sensor.

Example 6 includes the method of any of Examples 1-5, wherein determining whether a position determined by a GNSS receiver has been spoofed further comprises determining spoofing based upon both (i) the determined first set of residual distances and the determined first set of estimates of standard deviation, and (ii) the determined second set of residual distances and the determined second set of estimates of standard deviation.

Example 7 includes the method of any of Examples 1-6, further comprising assigning a scaling factor to at least one of: (i) the determined first set of residual distances and (ii) the determined second set of residual distances based upon the first set of estimates of standard deviation and the second set of estimates of standard deviation, respectively.

Example 8 includes a method, comprising: determining at least one of: (a) bearings to at least one Very High Frequency Omni-Directional Range (VOR) transmitter, and (b) ranges to at least one distance measuring equipment (DME); determining a potentially spoofed position using pseudoranges of at least four satellites of a global navigation satellite system (GNSS); determining a post hoc residual error of each of the pseudoranges; determining at least one of: (a) a first set of residual distances where each residual distance is represented by a difference between a determined bearing and an expected bearing based upon the potentially spoofed position projected onto a vector normal to a line of sight between the potentially spoofed position and a location of a corresponding VOR transmitter, and a first set of estimates of standard deviation, where each standard deviation is of a Gaussian normal distribution overbounding an expected error characteristic of a corresponding residual distance when spoofing is not present, and (b) a second set of residual distances where each residual distance is based upon a difference between the determined range to a corresponding DME and an expected range to the corresponding DME based upon the potentially spoofed position, and a second set of estimates of standard deviation where each standard deviation is of a Gaussian normal distribution overbounding an expected error characteristic of measurement error of the range to the corresponding DME when spoofing is not present; and determining whether position determined by a GNSS receiver has been spoofed based upon (a) the post hoc residual error of each of the pseudoranges, and (b) at least one of: (i) the determined first set of residual distances and the determined first set of estimates of deviation, and (ii) the determined second set of residual distances and the determined second set of estimates of deviation.

Example 9 includes the method of Example 8, wherein determining whether the position determined by a GNSS receiver has been spoofed is performed by a receiver autonomous integrity monitoring (RAIM) algorithm.

Example 10 includes the method of Example 9, wherein the RAIM algorithm is an advanced RAIM algorithm.

Example 11 includes the method of any of Examples 8-10, further comprising determining that the position determined by a GNSS receiver has been spoofed, and then generating an alarm signal sent to at least one system, where the alarm signal is configured to cause the at least one system to obtain position data from one or more systems other than the GNSS receiver.

Example 12 includes the method of any of Examples 8-11, wherein determining whether a position determined by a GNSS receiver has been spoofed further comprises determining spoofing based upon both (i) the determined first set of residual distances and the determined first set of estimates of standard deviation, and (ii) the determined second set of residual distances and the determined second set of estimates of standard deviation.

Example 13 includes the method of any of Examples 8-12, further comprising assigning a scaling factor to at least one of: (i) the determined first set of residual distances and (ii) the determined second set of residual distances based upon the first set of estimates of standard deviation and the second set of estimates of standard deviation, respectively.

Example 14 includes the method of any of Examples 8-13, further comprising switching to an alternative position determining system in response to a determination that the position determined by a GNSS receiver has been spoofed.

Example 15 includes a system, comprising: a Global Navigation Satellite System (GNSS) receiver, wherein the GNSS receiver is mounted to a vehicle, wherein the GNSS receiver is configured to receive pseudoranges from at least four satellites of a GNSS system; at least one of: a Very High Frequency Omnidirectional Range (VOR) receiver and a Distance Measuring Equipment (DME) receiver, wherein the VOR receiver is configured to determine a bearing to a VOR transmitter, wherein the DME receiver is configured to determine a range to a DME transmitter; and processing circuitry coupled to the at least one: VOR receiver and DME receiver, and the GNSS receiver, wherein the processing circuitry is configured to: determine a post-hoc residual error of each of the pseudoranges; determine at least one of: (a) a first set of residual distances where each residual distance is represented by a difference between a determined bearing and an expected bearing based upon a potentially spoofed position projected onto a vector normal to a line of sight between the potentially spoofed position and a location of a corresponding VOR transmitter, and a first set of estimates of standard deviation, where each standard deviation is of a Gaussian normal distribution overbounding an expected error characteristic of a corresponding residual distance when spoofing is not present, and (b) a second set of residual distances where each residual distance is based upon a difference between the determined range to a corresponding DME and an expected range to the corresponding DME based upon the potentially spoofed position, and a second set of estimates of standard deviation where each standard deviation is of a Gaussian normal distribution overbounding an expected error characteristic of measurement error of the range to the corresponding DME when spoofing is not present, and determining whether position determined by a GNSS receiver has been spoofed based upon (a) the post-hoc residual error of each of the pseudoranges, and (b) at least one of: (i) the determined first set of residual distances and the determined first set of estimates of deviation, and (ii) the determined second set of residual distances and the determined second set of estimates of deviation.

Example 16 includes the system of Example 15, wherein to determine whether the position determined by a GNSS receiver has been spoofed further comprises determine by a receiver autonomous integrity monitoring (RAIM) algorithm.

Example 17 includes the system of Example 16, wherein the RAIM algorithm is an advanced RAIM algorithm.

Example 18 includes the system of any of Examples 15-17, wherein the processing circuitry is further configured to, upon determining that the position determined by a GNSS receiver has been spoofed, generate an alarm signal sent to at least one system, where the alarm signal is configured to cause the at least one system to obtain position data from one or more systems other than the GNSS receiver.

Example 19 includes the system of any of Examples 15-18, wherein to determine whether a position determined by a GNSS receiver has been spoofed further comprises determine spoofing based upon both (i) the determined first set of residual distances and the determined first set of estimates of standard deviation, and (ii) the determined second set of residual distances and the determined second set of estimates of standard deviation.

Example 20 includes the system of any of Examples 15-19, wherein the processing circuitry is further configured to assign a scaling factor to at least one of: (i) the determined first set of residual distances and (ii) the determined second set of residual distances based upon the first set of estimates of standard deviation and the second set of estimates of standard deviation, respectively.

Example 21 includes a method, comprising: determining: (a) bearings to a first identified set of terrain features, and (b) ranges to a second identified set of terrain features; determining a potentially spoofed position using pseudoranges from at least four satellites of a global navigation satellite system (GNSS); determining a post-hoc residual error of each of the pseudoranges; determining: (a) a first set of residual distances where each residual distance is represented by a difference between a determined bearing and an expected bearing based upon the potentially spoofed position projected onto a vector normal to a line of sight between the potentially spoofed position and a location of the first identified terrain feature, and a first set of estimates of standard deviation, where each standard deviation is of a Gaussian normal distribution overbounding an expected error characteristic of a corresponding residual distance when spoofing is not present, and (b) a second set of residual distances where each residual distance is based upon a difference between the determined range to the second identified terrain feature and an expected range to the second identified terrain feature based upon the potentially spoofed position, and a second set of estimates of standard deviation where each standard deviation is of a Gaussian normal distribution overbounding an expected error characteristic of measurement error of the range to the second identified terrain feature when spoofing is not present; and determining whether position determined by a GNSS receiver has been spoofed based upon (a) the post-hoc residual error of each of the pseudoranges, and (b): (i) the determined first set of residual distances and the determined first set of estimates of deviation, and (ii) the determined second set of residual distances and the determined second set of estimates of deviation.

Example 22 includes the method of Example 21, wherein determining whether the position determined by a GNSS receiver has been spoofed is performed by a receiver autonomous integrity monitoring (RAIM) algorithm.

Example 23 includes the method of Example 22, wherein the RAIM algorithm is an advanced RAIM algorithm.

Example 24 includes the method of any of Examples 21-23, further comprising determining that the position determined by a GNSS receiver has been spoofed, and then generating an alarm signal sent to at least one system, where the alarm signal is configured to cause the at least one system to obtain position data from one or more systems other than the GNSS receiver.

Example 25 includes the method of any of Examples 21-24, wherein the first and second identified sets of terrain features each comprise a plurality of terrain features and wherein determining the bearings to a first identified set of terrain features and ranges to a second identified set of terrain features further comprises at least one terrain feature of the first identified set of terrain features included in the second identified set of terrain features.

Example 26 includes the method of any of Examples 21-25, further comprising assigning a scaling factor to at least one of: (i) the determined first set of residual distances and (ii) the determined second set of residual distances based upon the first set of estimates of standard deviation and the second set of estimates of standard deviation, respectively.

Example 27 includes the method of any of Examples 21-26, wherein the potentially spoofed position corresponds to a position of a vehicle acquired by at least one GNSS receiver.

Example 28 includes the method of any of Examples 21-27, wherein the at least one of bearings and ranges are determined by one or more radar sensors.

Example 29 includes a system, comprising: a Global Navigation Satellite System (GNSS) receiver, wherein the GNSS receiver is mounted to a vehicle, wherein the GNSS receiver is configured to receive pseudoranges from at least four satellites of a GNSS system; at least one radar or lidar sensor, wherein the at least one radar or lidar sensor is configured to determine: a bearing to a first identified set of terrain features, and a range to a second identified set of terrain features; and processing circuitry coupled to the at least one radar or lidar sensor and the GNSS receiver, wherein the processing circuitry is configured to: determine a post-hoc residual error of each of the pseudoranges; determines: (a) a first set of residual distances where each residual distance is represented by a difference between a determined bearing and an expected bearing based upon a potentially spoofed position projected onto a vector normal to a line of sight between the potentially spoofed position and a location of the first identified set of terrain features, and a first set of estimates of standard deviation, where each standard deviation is of a Gaussian normal distribution overbounding an expected error characteristic of a corresponding residual distance when spoofing is not present, and (b) a second set of residual distances where each residual distance is based upon a difference between the determined range to a corresponding radar or lidar sensor and an expected range to the second identified set of terrain features based upon the potentially spoofed position, and a second set of estimates of standard deviation where each standard deviation is of a Gaussian normal distribution overbounding an expected error characteristic of measurement error of the range to the second identified terrain feature when spoofing is not present, and determine whether position determined by a GNSS receiver has been spoofed based upon (a) the post-hoc residual error of each of the pseudoranges, and (b): (i) the determined first set of residual distances and the determined first set of estimates of deviation, and (ii) the determined second set of residual distances and the determined second set of estimates of deviation.

Example 30 includes the system of Example 29, wherein to determine whether the position determined by a GNSS receiver has been spoofed further comprises determine by a receiver autonomous integrity monitoring (RAIM) algorithm.

Example 31 includes the system of Example 30, wherein the RAIM algorithm is an advanced RAIM algorithm.

Example 32 includes the system of any of Examples 29-31, wherein the processing circuitry is further configured to, upon determining that the position determined by a GNSS receiver has been spoofed, generate an alarm signal sent to at least one system, where the alarm signal is configured to cause the at least one system to obtain position data from one or more systems other than the GNSS receiver.

Example 33 includes the system of any of Examples 29-32, wherein the first and second identified sets of terrain features each comprise a plurality of terrain features and wherein to determine the bearings to a first identified set of terrain features and ranges to a second identified set of terrain features further comprises at least one terrain feature of the first identified set of terrain features included in the second identified set of terrain features.

Example 34 includes the system of any of Examples 29-33, wherein the processing circuitry is further configured to assign a scaling factor to at least one of: (i) the determined first set of residual distances and (ii) the determined second set of residual distances based upon the first set of estimates of standard deviation and the second set of estimates of standard deviation, respectively.

Example 35 includes the system of any of Examples 29-34, wherein the processing circuitry is further configured to determine the first identified set of terrain features and the second identified set of terrain features.

Example 36 includes a program product comprising a non-transitory processor-readable medium on which program instructions, configured to be executed by a programmable processor, are embodied, wherein the program instructions are operable to: receive: (a) bearings to a first identified set of terrain features, and (b) ranges to a second identified set of terrain features; receive a potentially spoofed position determined using pseudoranges from at least four satellites of a global navigation satellite system (GNSS); determine post-hoc residual error of each of the pseudoranges; determine at least one of: (a) a first set of residual distances where each residual distance is represented by a difference between a determined bearing and an expected bearing based upon the potentially spoofed position projected onto a vector normal to a line of sight between the potentially spoofed position and a location of the first identified set of terrain features, and a first set of estimates of standard deviation, where each standard deviation is of a Gaussian normal distribution overbounding an expected error characteristic of a corresponding residual distance when spoofing is not present, and (b) a second set of residual distances where each residual distance is based upon a difference between the determined range to a corresponding radar or lidar sensor and an expected range to the second identified set of terrain features based upon the potentially spoofed position, and a second set of estimates of standard deviation where each standard deviation is of a Gaussian normal distribution overbounding an expected error characteristic of measurement error of the range to the second identified terrain feature when spoofing is not present, and determine whether position determined by a GNSS receiver has been spoofed based upon (a) the post-hoc residual error of each of the pseudoranges, and (b): (i) the determined first set of residual distances and the determined first set of estimates of deviation, and (ii) the determined second set of residual distances and the determined second set of estimates of deviation.

Example 37 includes the program product of Example 36, wherein to determine whether the position determined by a GNSS receiver has been spoofed further comprises determine by a receiver autonomous integrity monitoring (RAIM) algorithm.

Example 38 includes the program product of Example 37, wherein the RAIM algorithm is an advanced RAIM algorithm.

Example 39 includes the program product of any of Examples 36-38, wherein the first and second identified sets of terrain features each comprise a plurality of terrain features and wherein to determine the bearings to a first identified set of terrain features and ranges to a second identified set of terrain features further comprises at least one terrain feature of the first identified set of terrain features included in the second identified set of terrain features.

Example 40 includes the program product of any of Examples 36-39, wherein the program instructions are further operable to assign a scaling factor to at least one of: (i) the determined first set of residual distances and (ii) the determined second set of residual distances based upon the first set of estimates of standard deviation and the second set of estimates of standard deviation, respectively.

Terms of relative position as used in this application are defined based on a plane parallel to the conventional plane or working surface of a material (e.g. a layer or a substrate), regardless of orientation. Terms such as "on," "higher," "lower," "over," "top," and "under" are defined with respect to the conventional plane or working surface being on the top surface of a layer or substrate, regardless of orientation.

A number of embodiments of the disclosure defined by the following claims have been described. Nevertheless, it will be understood that various modifications to the described embodiments may be made without departing from the spirit and scope of the claimed disclosure. Accordingly, other embodiments are within the scope of the following claims.

What is claimed is:

1. A method, comprising:
    determining:
        (a) bearings based on at least one first point of interest corresponding to a first identified set of terrain features, and
        (b) ranges based on at least one second point of interest corresponding to a second identified set of terrain features;
    determining a potentially spoofed position using pseudoranges from at least four satellites of a global navigation satellite system (GNSS);
    determining a post-hoc residual error of each of the pseudoranges;
    determining at least one of:
        (a) a first set of residual distances where each residual distance is represented by a difference between a determined bearing and an expected bearing based upon the potentially spoofed position projected onto a vector normal to a line of sight between the potentially spoofed position and a location of the first identified set of terrain features, and a first set of estimates of standard deviation, where each standard deviation is of a Gaussian normal distribution overbounding an expected error characteristic of a corresponding residual distance when spoofing is not present, and
        (b) a second set of residual distances where each residual distance is based upon a difference between the determined range to the second identified set of terrain features and an expected range to the second identified set of terrain features based upon the potentially spoofed position, and a second set of estimates of standard deviation where each standard deviation is of the Gaussian normal distribution overbounding an expected error characteristic of measurement error of the range to the second identified set of terrain features when spoofing is not present; and determining whether position determined by the at least one GNSS receiver has been spoofed based upon (a) the post-hoc residual error of each of the pseudoranges, and at least one of (b): (i) the determined first set of residual distances and the determined first set of estimates of deviation, and (ii) the determined second set of residual distances and the determined second set of estimates of deviation; and when the position is determined by the at least one GNSS receiver to have been spoofed, taking corrective action by at least one of: disabling use of the at least one GNSS receiver, switching to an alternative positioning system to use for vehicle navigation, and resetting the at least one GNSS receiver after a period of time.

2. The method of claim 1, wherein determining whether the position determined by the GNSS receiver has been spoofed is performed by a receiver autonomous integrity monitoring (RAIM) algorithm.

3. The method of claim 2, wherein the RAIM algorithm is an advanced RAIM algorithm.

4. The method of claim 1, wherein determining that the position determined by the at least one GNSS receiver has been spoofed, further comprising generating an alarm signal sent to at least one system, where the alarm signal is configured to cause the at least one system to obtain position data from one or more systems other than the GNSS receiver.

5. The method of claim 1, wherein the first and second identified sets of terrain features each comprise a plurality of terrain features and wherein determining the bearings to a first identified set of terrain features and ranges to a second identified set of terrain features further comprises at least one terrain feature of the first identified set of terrain features included in the second identified set of terrain features.

6. The method of claim 1, further comprising assigning a weighting value to at least one of (i) the determined first set of residual distances and (ii) the determined second set of residual distances based upon the first set of estimates of standard deviation and the second set of estimates of standard deviation.

7. The method of claim 1, wherein the potentially spoofed position corresponds to a position of a vehicle acquired by the at least one GNSS receiver.

8. The method of claim 1, wherein at least one of bearings and ranges are determined by one or more radar sensors.

9. A system, comprising:
at least one a Global Navigation Satellite System (GNSS) receiver, wherein the at least one GNSS receiver is mounted to a vehicle, wherein the at least one GNSS receiver is configured to receive pseudoranges from at least four satellites of a GNSS system;

at least one radar or lidar sensor, wherein the at least one radar or lidar sensor is configured to determine:

a bearing based on at least one first point of interest corresponding to a first identified set of terrain features, and a range based on at least one second point of interest corresponding to a second identified set of terrain features, and processing circuitry coupled to the at least one radar or lidar sensor and the at least one GNSS receiver, wherein the processing circuitry is configured to:

determine a post-hoc residual error of each of the pseudoranges;

determine at least one of:

(a) a first set of residual distances where each residual distance is represented by a difference between a determined bearing and an expected bearing based upon a potentially spoofed position projected onto a vector normal to a lime of sight between the potentially spoofed position and a location of the first identified set of terrain features, and a first set of estimates of standard deviation, where each standard deviation is of a Gaussian normal distribution overbounding an expected error characteristic of a corresponding residual distance when spoofing is not present, and (b) a second set of residual distances where each residual distance is based upon a difference between the determined range to a corresponding radar or lidar sensor and an expected range to the second identified set of terrain features based upon the potentially spoofed position, and a second set of estimates of standard deviation where each standard deviation is of the Gaussian normal distribution overbounding an expected error characteristic of measurement error of the range to the second identified set of terrain features when spoofing is not present, and determine whether position determined by the at least one GNSS receiver has been spoofed based upon (a) the post-hoc residual error of each of the pseudoranges, and at least one of (b): (i) the determined first set of residual distances and the determined first set of estimates of deviation, and (ii) the determined second set of residual distances and the determined second set of estimates of deviation; and when the position is determined by the at least one GNSS receiver to have been spoofed, take corrective action by at least one of: disabling use of the at least one GNSS receiver, switching to an alternative positioning system to use for vehicle navigation, and resetting the at least one GNSS receiver after a period of time.

10. The system of claim 9, wherein to determine whether the position determined by the at least one GNSS receiver has been spoofed further comprises determine by a receiver autonomous integrity monitoring (RAIM) algorithm.

11. The system of claim 10, wherein the RAIM algorithm is an advanced RAIM algorithm.

12. The system of claim 9, wherein the processing circuitry is further configured to, upon determining that the position determined by the at least one GNSS receiver has been spoofed, generate an alarm signal sent to at least one system, where the alarm signal is configured to cause the at least one system to obtain position data from one or more systems other than the at least one GNSS receiver.

13. The system of claim 9, wherein the first and second identified sets of terrain features each comprise a plurality of terrain features and wherein to determine the bearings of a first identified set of terrain features and ranges to a second identified set of terrain features further comprises at least one terrain feature of the first identified set of terrain features included in the second identified set of terrain features.

14. The system of claim 9, wherein the processing circuitry is further configured to assign a scaling factor to at least one of: (i) the determined first set of residual distances and (ii) the determined second set of residual distances based upon the first set of estimates of standard deviation and the second set of estimates of standard deviation.

15. The system of claim 9, wherein the processing circuitry is further configured to determine the first identified set of terrain features and the second identified set of terrain features.

16. A program product comprising a non-transitory processor-readable medium on which program instructions, configured to be executed by a programmable processor, are embodied, wherein the program instructions are operable to:
 receive:
  (a) bearings based on at least one first point of interest corresponding to a first identified set of terrain features, and
  (b) ranges based on at least one second point of interest corresponding to a second identified set of terrain features;
 receive a potentially spoofed position determined using pseudoranges from at least four satellites of a global navigation satellite system (GNSS):
 determine a post-hoc residual error of each of the pseudoranges:
 determine at least one of:
  (a) a first set of residual distances where each residual distance is represented by a difference between a determined bearing and an expected bearing based upon the potentially spoofed position projected onto a vector normal to a lime of sight between the potentially spoofed position and a location of the first identified set of terrain features, and a first set of estimates of standard deviation, where each standard deviation is of a Gaussian normal distribution overbounding an expected error characteristic of a corresponding residual distance when spoofing is not present, and
  (b) a second set of residual distances where each residual distance is based upon a difference between the determined range to a corresponding radar or lidar sensor and an expected range to the second identified set of terrain features based upon the potentially spoofed position, and a second set of estimates of standard deviation where each standard deviation is of the Gaussian normal distribution overbounding an expected error characteristic of measurement error of the range to the second identified set of terrain features when spoofing is not present, and
 determine whether position determined by at least one GNSS receiver has been spoofed based upon
  (a) the post-hoc residual error of each of the pseudoranges, and at least one of
  (b): (i) the determined first set of residual distances and the determined first set of estimates of deviation, and
  (ii) the determined second set of residual distances and the determined second set of estimates of deviation; and
 when the position is determined by the at least one GNSS receiver to have been spoofed, taking corrective action by at least one of: disabling use of the at least one GNSS receiver, switching to an alternative positioning system to use for vehicle navigation, and resetting the at least one GNSS receiver after a period of time.

17. The program product of claim 16, wherein the program instructions are configured to determine whether the position determined by the at least one GNSS receiver has been spoofed further comprises determine by a receiver autonomous integrity monitoring (RAIM) algorithm.

18. The program product of claim 17, wherein the RAIM algorithm is an advanced RAIM algorithm.

19. The program product of claim 16, wherein the first and second identified sets of terrain features each comprises a plurality of terrain features and wherein to determine the bearings to a first identified set of terrain features and ranges to a second identified set of terrain features further comprises at least one terrain feature of the first identified set of terrain features included in the second identified set of terrain features.

20. The program product of claim 16, wherein the program instructions are further operable to assign a scaling factor to at least one of: (i) the determined first set of residual distances and (ii) the determined second set of residual distances based upon the first set of estimates of standard deviation and the second set of estimates of standard deviation.

* * * * *